(12) United States Patent
Hua

(10) Patent No.: US 7,545,588 B2
(45) Date of Patent: Jun. 9, 2009

(54) FOCUSING-FREE MICROLENS ASSEMBLY AND THE METHOD OF MAKING THE SAME

(75) Inventor: Ting-Kuo Hua, Taipei (TW)

(73) Assignee: Ether Precision, Inc., George Town-Grand Cayman (KY)

( * ) Notice: Subject to any disclaimer, the term of this patent is extended or adjusted under 35 U.S.C. 154(b) by 192 days.

(21) Appl. No.: 11/640,257

(22) Filed: Dec. 18, 2006

(65) Prior Publication Data

US 2008/0007845 A1    Jan. 10, 2008

(51) Int. Cl.
G02B 7/02    (2006.01)

(52) U.S. Cl. .................. 359/811; 359/813; 359/815

(58) Field of Classification Search .................. 359/811, 359/813, 815, 819–823
See application file for complete search history.

(56) References Cited

U.S. PATENT DOCUMENTS

| 5,570,231 A * | 10/1996 | Mogamiya .................. 359/640 |
| 7,379,113 B2 * | 5/2008 | Kong et al. .................. 348/340 |
| 2005/0162538 A1 * | 7/2005 | Kurosawa .................... 348/335 |

* cited by examiner

Primary Examiner—Timothy J Thompson
(74) Attorney, Agent, or Firm—Troxell Law Office, PLLC

(57) ABSTRACT

A focusing-free microlens assembly includes a holder and a plurality of optical lenses mounted on the holder. Each of the holder and the optical lenses has a tolerance, and a combinative tolerance of the tolerances of the holder and the optical lenses is less than a depth of focus.

3 Claims, 3 Drawing Sheets

FOCUSING-FREE MICROLENS ASSEMBLY AND THE METHOD OF MAKING THE SAME

BACKGROUND OF THE INVENTION

1. Field of the Invention

The present invention relates generally to an optical lens assembly, and more particularly to a focusing-free microlens assembly and the method of making the same.

2. Description of the Related Art

A conventional optical lens has a constant focus, a constant depth of field and a constant depth of focus. In a condition of keeping an image with a constant depth of focus, the depth of focus is defined as a permitted distance of the focus moving along an optical axis of the lens, in which the lens may catch a clear image.

As shown in FIG. 1, a conventional image catch unit 1 includes a lens assembly 2 and an image sensor 3. The lens assembly 2 is mounted on the image sensor 3. The lens assembly 2 includes a plurality of lenses 4, a barrel 5 and a holder 6. The lenses 4 adhere to the barrel 5, and then the barrel 5 is fixed on the holder 6. At least, the holder 6 adheres to the image sensor 3. The image sensor 3 is kept in the depth of focus. Because of the tolerance of each component of the image catch unit, it always causes a change of focus, unable focusing and some other problem when these components are assembled together. It makes the image catch unit 1 having a high ratio of defective and needing focusing adjustment that making the process of fabrication complex.

An improved lens assembly with a focusing-free function includes a lens mask, a lens, a base and an image sensor. The lens mask is mounted at a position, on which the lens and the image sensor in the mask have an optimal focus therebetween to transfer the image directly to the image sensor via the lens without focusing adjustment.

However, the components of above improved lens assembly still have tolerances respectively. These tolerances cause a change of focus also that the lens assembly has a bad function of focusing-free.

SUMMARY OF THE INVENTION

The primary objective of the present invention is to provide a focusing-free microlens assembly, which has fewer components to reduce the effect of the tolerances of the components. The sum of the tolerances of the components is less than the depth of focus that achieves a real focusing-free function.

The present invention also provides a method of making the focusing-free microlens assembly, which has a simple process and lower cost.

According to the objectives of the present invention, a focusing-free microlens assembly includes a holder and a plurality of optical lenses mounted on the holder. Each of the holder and the optical lenses has a tolerance, and a combinative tolerance of the tolerances of the holder and the optical lenses is less than a depth of focus.

DETAILED DESCRIPTION OF THE INVENTION

Figure 1:
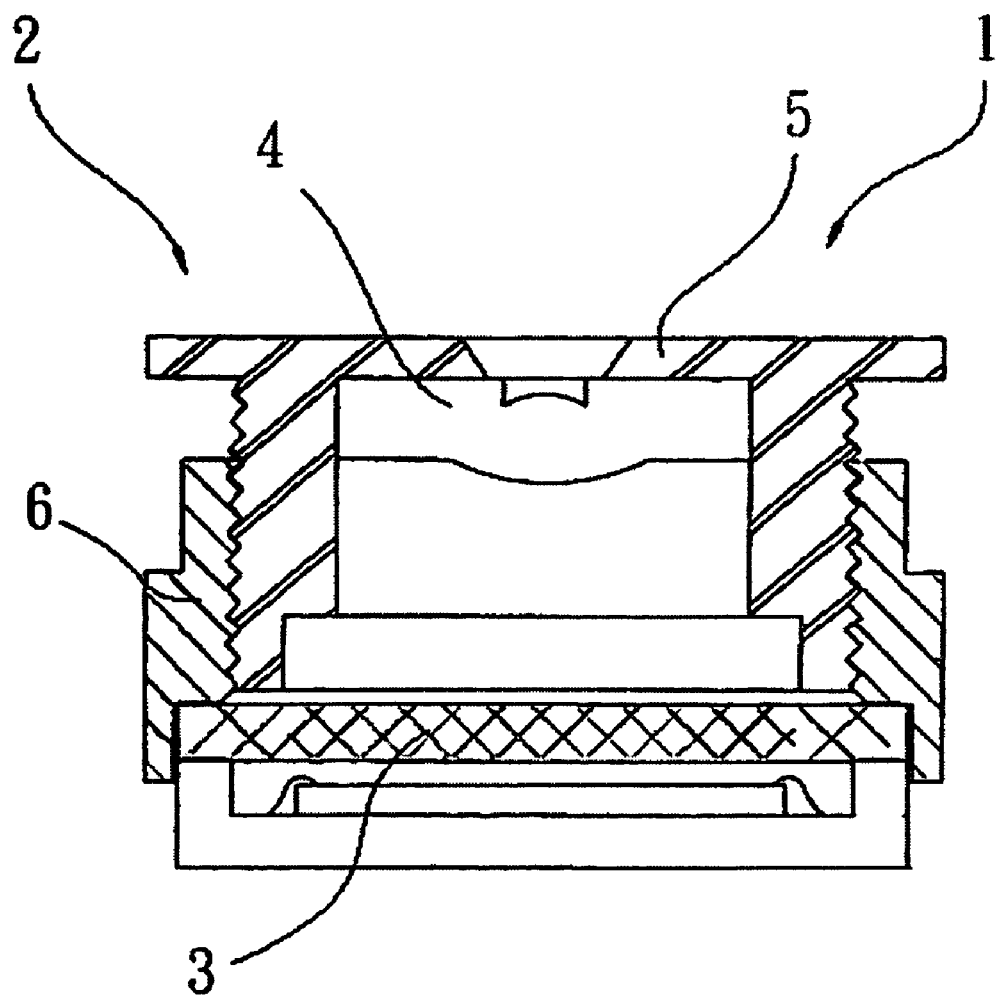
FIG. 1 is a sectional view of conventional image catch unit.
Figure 2:
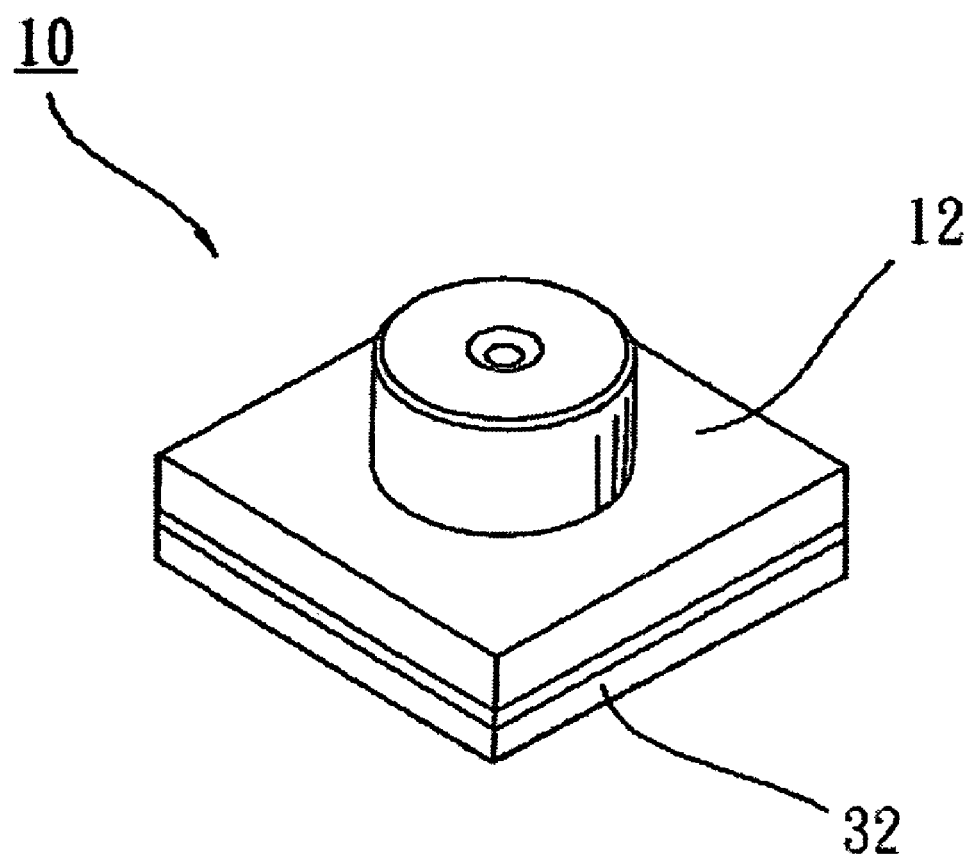
FIG. 2 is a perspective of a preferred embodiment of the present invention.
Figure 3:
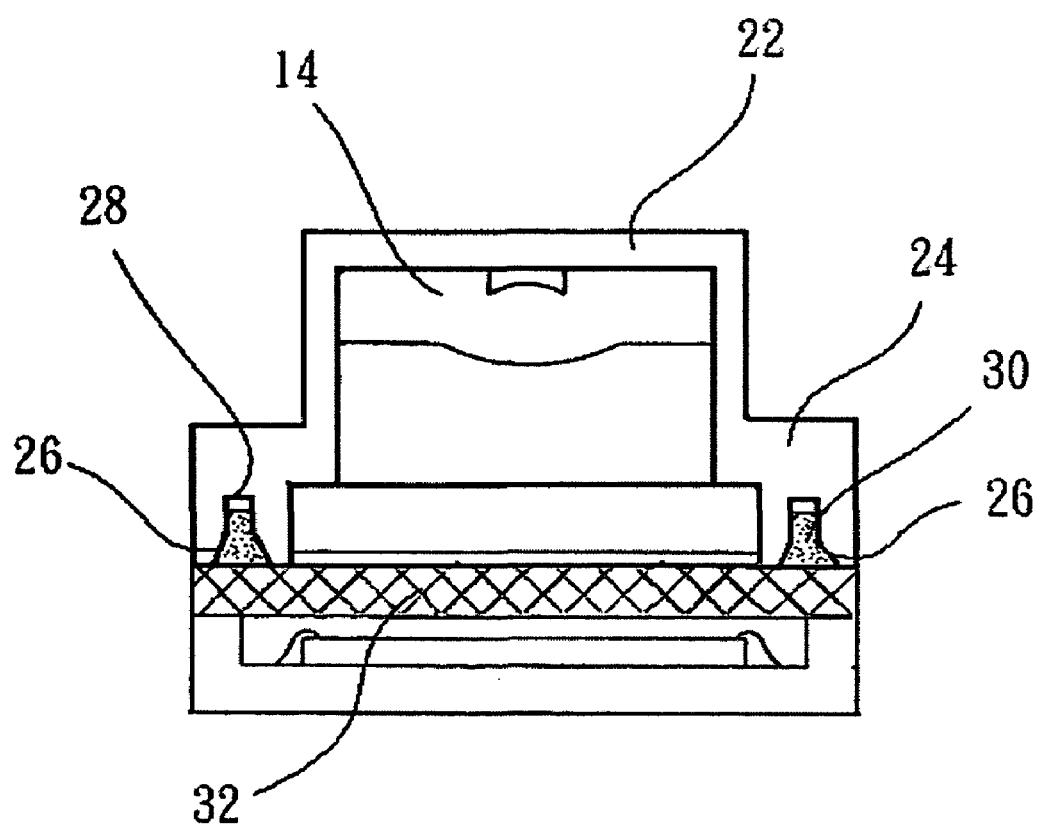
FIG. 3 is a sectional view of the preferred embodiment of the present invention.

As shown in FIG. 1 to FIG. 4, a focusing-free microlens assembly 10 of the preferred embodiment of the present invention has a depth of focus of 17 μm. The depth of focus includes a 12 μm front depth of focus and a 5 μm rear depth of focus. The microlens assembly 10 includes a holder 12 made of metallic or plastic with a 5 μm tolerance of height, a barrel 22 with a connecting base 24 at an end thereof and an optical lens 14. The barrel 22 is opening at opposite ends, one of which is closed by the connecting base 24. The connecting base 24 has a plurality of apertures 26, each of which has a flowing space 28 at a bottom thereof. The optical lens 14, which is made of plastic or glass, has a 5 μm tolerance at a center thickness. The optical lens 14 is mounted in the barrel 22.

Adhesive 30 is added in the apertures 26 of the connecting base 24 to adhere to an image sensor 32. The connecting base 24 will be connected to the image sensor 32 tightly because the redundant adhesive 30 will flows into the flowing spaces 28 rather than between the connecting base 24 and the image sensor 32. As a result, the combinative tolerance of the holder 12 and the lens 14 is less than the depth of focus (17 μm) that cause the microlens assembly has a real function of focusing-free.

The present invention also provides a method of making the microlens assembly of focusing-free. In other words, in fabrication, the combinative tolerance of the optical lens and the holder is kept less than the depth of focus that may achieve the focusing-free function.

In conclusion, the present invention provides the optical lens mounted in the barrel-like holder directly. As compared with the conventional lens assembly, which the optical lens is mounted in the barrel, the microlens assembly of the present invention has less components and a less combinative tolerance. In addition, the combinative tolerance is kept less than the depth of focus that the microlens assembly of the present invention doesn't need the focusing adjustment process. It reduce the cost of fabrication.

The description above is a few preferred embodiments of the present invention and the equivalence of the present invention is still in the scope of the claim of the present invention.

What is claimed is:

1. A focusing-free microlens assembly, comprising a holder and a plurality of optical lenses mounted on the holder, wherein each of the holder and the optical lenses has a tolerance, and a combinative tolerance of the tolerances of the holder and the optical lenses is less than a depth of focus,
    wherein the holder has a barrel with opposite opening ends, on the opposite opening ends of which the lenses and an image sensor are provided respectively,
    wherein the holder is provided with a plurality of apertures, in which adhesive is provided, associated with the image sensor,
    wherein the holder further has a plurality of flowing spaces communicated with the apertures.

2. The focusing-free microlens assembly as defined in claim 1, wherein the holder further includes a connecting base on an end of the barrel to be connected to the image sensor, and the apertures are provided on the connecting base and the flowing spaces are provided in the connecting in the connecting space.

3. The focusing-free microlens assembly as defined in claim 1, wherein the lenses are received in the barrel through the opening end opposite the image sensor.

* * * * *